Jan. 5, 1943.  W. J. SCHAFFER ET AL  2,307,471

SHAVING IMPLEMENT

Filed Sept. 21, 1938

INVENTORS
WILLIAM J. SCHAFFER
FRED N. LAYLE

BY W. A. Sparks
ATTORNEY

Patented Jan. 5, 1943

2,307,471

UNITED STATES PATENT OFFICE 2,307,471

SHAVING IMPLEMENT

William J. Schaffer, Bridgeport, and Fred N. Layle, Stamford, Conn., assignors to Remington Rand Inc., Buffalo, N. Y., a corporation of Delaware Application September 21, 1938, Serial No. 231,012

4 Claims. (Cl. 30—43)

This invention relates to improvements in shaving implements, and particularly to the construction of the inner cutting members thereof. It is adapted for use in connection with shaving heads of the channeled type, comprising a fixed outer shear plate and an inner cutting member mounted for movement therein.

Inner cutting members of the kind referred to, as a rule have cutting teeth formed on their outer surface, which are adapted for shearing engagement with cutting edges formed on their associated outer shear plates. These teeth are usually formed by cutting slots in the face of the cutting member with rotatable cutters or saws, requiring a great deal of manufacturing skill and precision, and adding greatly to the cost of manufacture. Besides, teeth so formed often leave ragged edges which result in injury to the skin when the shaving implement is passed over the face.

It is the principal object of this invention to provide an inner cutting member having grooves in the form of a screw thread cut in its inner surface, a portion of which penetrates the outer surface thereof to form teeth which have uniform edges, and avoid any injury to the skin.

Another object of this invention is to provide an inner cutting member that may be produced in large quantities without the usual manufacturing precision, and at a greatly reduced cost.

An advantage of inner cutting members formed as described herein, is that cutting teeth may be formed on exceptionally thin surfaces without reducing the supporting strength and durability of the cutter.

Further objects and advantages will be made apparent in the following more detailed description of the operation and construction of this invention when read in connection with the attached drawing, in which Fig. 1 is a side elevation of the upper portion of a razor embodying this invention, with parts of the shearing head broken away to disclose the inner cutting member;

Like characters of reference refer to like parts in the drawing.

Figure 1:
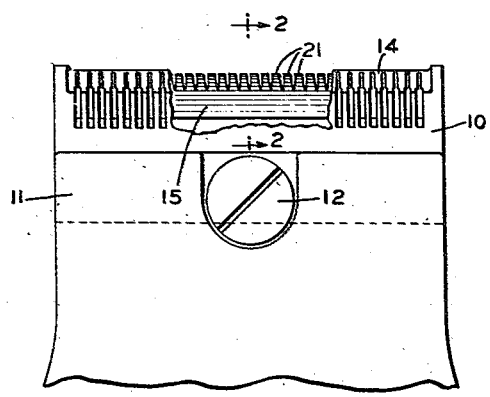
Figure 2:
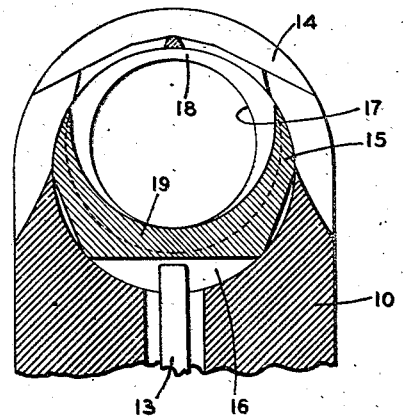
Fig. 2 is an enlarged end section thereof taken substantially along line 2—2 of Fig. 1.
Figure 3:
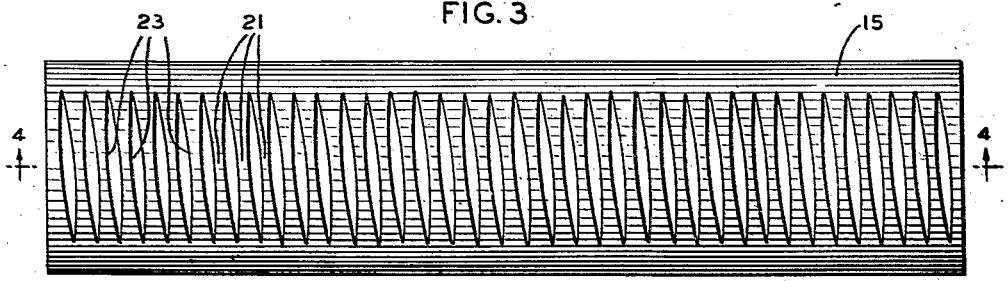
Fig. 3 is an enlarged top plan view of an inner cutting member according to this invention.
Figure 4:
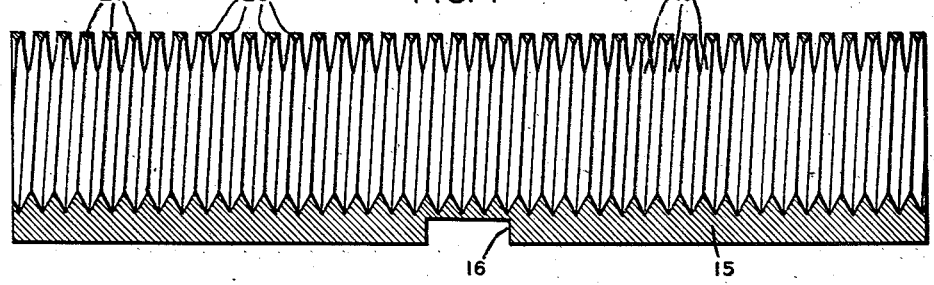
Fig. 4 is a longitudinal cross section of the inner cutter taken substantially along line 4—4 of Fig. 3.

A shaving head 10 in accordance with this invention, is shown secured to a portion of a well known type of razor casing 11, by a set screw 12 (Fig. 1). Casing 11 encloses any well known driving means (not shown). Shaving head 10 disclosed in Figs. 1 and 2 is substantially similar to that disclosed in Patent No. 2,108,493 issued to H. Landsiedel on February 15, 1938.

The shaving head 10 comprises an outer shear plate or cutter 14 having a central bore in which is positioned an inner cutter 15. The inner cutter is adapted to be reciprocated therein by a driving lever 13 (Fig. 2), which engages a slot 16 in the base of the cutter. The outer shear plate is similar to that disclosed and described in the above mentioned patent. In view of this fact it is only necessary to state that the upper portion thereof is provided with a plurality of closely positioned narrow slots, the edges of which form a shearing medium.

According to Figs. 1 to 4, inclusive, the inner cutting member 15 in which the improvement resides, is substantially cylindrical, having an eccentric bore 17 forming a portion 18 thereof, of reduced thickness. Grooves or threads 19 are formed on its inner surface, said grooves being formed circumferentially of said inner surface. In forming the cutting edges, a cylindrical blank having an eccentric bore 17 is threaded internally by a tap having cutting members of sufficient depth for forming threads 19 which will penetrate the reduced portion 18. The grooves or threads thus formed provide teeth or cutter blades 21, having smooth concave surfaces with substantially uniform and regular edges. It will be noted in Fig. 4 that teeth 21 taper at an acute angle on the under side, thereby forming exceptionally keen cutting edges 23 which will retain their edge even after extensive wear, and thus be self sharpening. Due to the fact that the cutting members of the tap are set at an angle, the teeth 21 formed thereby will be disposed at an angle to the longitudinal axis of the cutter.

Figure 5:
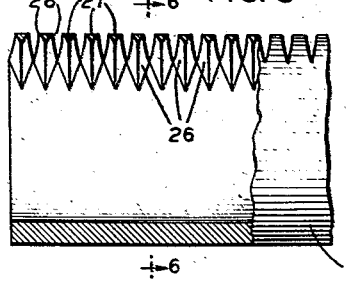
Fig. 5 is a fragmentary portion of a modified form of an inner cutting member with parts broken away to reveal the inner surface thereof.
Figure 6:
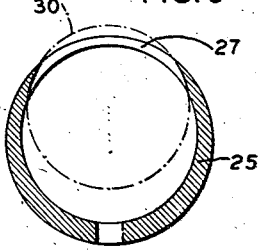
Fig. 6 is an end section, taken substantially along line 6—6 of Fig. 5.

In Figs. 5 and 6 a modified form of inner cutting member 25 is shown, in which grooves 26 are formed from the inside of said cutting member and only in the reduced portion. These grooves are formed with a gang cutter or harp (indicated in end elevation by dot and dash lines 30 in Fig. 6) instead of a tap and, therefore, leave the remainder of the bore smooth. The gang cutter is formed of a series of equally spaced saws of a diameter smaller than the bore of said cutter. The saws have teeth thereon formed to cut a V shaped groove. The grooves 26 form teeth 27 which are perpendicular to the axis of the cutter, as shown in Figs. 5 and 6, and taper inwardly as above, having smooth outer surfaces and regular cutting edges 28.

The process of manufacture comprises, the cutting of blank stock to the required length, clamping the blank in a fixed rest, then introducing the gang cutter, and feeding the cutter into the blank the desired depth to form grooves 26.

It is to be noted that inner cutting members formed in the manner described, provide grooves on the inner surface thereof which form a plurality of supporting webs for the cutter, adding greatly to the strength and durability thereof. Furthermore, these supporting webs permit teeth to be formed on exceptionally thin surfaces without weakening the cutter. Teeth formed from within in this manner taper inwardly, providing sharp regular edges and smooth outer surfaces affording effective shearing means without irritating the skin.

While we have described what we consider to be highly desirable embodiments of our invention, it is obvious that many changes in form could be made without departing from the spirit of our invention, and we, therefore, do not limit ourselves to the exact form herein shown and described.

What we claim as new, and desire to secure by Letters Patent, is:

1. In a shaving head, the combination of an outer cutter, and a cylindrical inner cutter mounted for longitudinal movement within said outer cutter and having transverse cutter bars of substantially triangular cross-section, said cutter bars being formed from within said cylindrical inner cutter by spiral cutting means operated in eccentric relation to said inner cutter to cut spaced slots therethrough.

2. An inner cutter for dry shavers comprising a solid cutter body having a cylindrical outer surface and a longitudinal bore eccentric to said outer surface forming diametrically opposite portions of said body with a relatively thin and a relatively thick cross section respectively, the inner surface of said body in said bore being formed with spiral thread portions having the outermost sections intersecting said outer surface at spaced intervals throughout a longitudinal segment of said outer surface to form a plurality of transversely extending slots and a plurality of spaced spiral transversely extending cutter bars having cutting edges on opposite sides formed at the intersection of the inner surfaces of said thread portions with said outer surface.

3. An inner cutter for dry shavers, comprising a solid cutter body having a cylindrical outer surface and a spiral thread defining the inner surface of a longitudinal eccentric bore in said body, said thread intersecting said outer surface along a longitudinal segment only and forming a plurality of spaced spiral cutter bars extending transversely of said segment with slots therebetween and cutting edges on the side edges of said bars at the intersection of the inner sides of said thread with said cylindrical surface in said segment.

4. An inner cutter for dry shavers, comprising a solid cutter body having a cylindrical outer surface and an inner longitudinal bore, said body having a cylindrical segment formed by an internal spiral thread in said bore forming a plurality of spaced spiral segment cutter bars extending transversely of said cylindrical segment with cutting edges on opposite sides of said bars formed by the intersection of the inner surfaces of said thread with said outer cylindrical surface.

WM. J. SCHAFFER.
FRED N. LAYLE.